United States Patent [19]

Harasaki

[11] Patent Number: 5,102,187
[45] Date of Patent: Apr. 7, 1992

[54] REINFORCED FLOOR STRUCTURE FOR AN AUTOMOTIVE VEHICLE

[75] Inventor: Hayatsugu Harasaki, Hiroshima, Japan

[73] Assignee: Mazda Motor Corporation, Shinchi, Japan

[21] Appl. No.: 630,663

[22] Filed: Dec. 20, 1990

[30] Foreign Application Priority Data

Dec. 22, 1989 [JP] Japan .................. 1-331074

[51] Int. Cl.$^5$ .......................................... B62D 23/00
[52] U.S. Cl. ................................ 296/204; 296/208
[58] Field of Search ............. 296/204, 188, 185, 208, 296/194, 195, 197

[56] References Cited

U.S. PATENT DOCUMENTS

| | | | |
|---|---|---|---|
| 3,423,122 | 1/1969 | Wessells, III | 296/204 |
| 4,402,545 | 9/1983 | Utsunomiya et al. | 296/204 |
| 4,557,519 | 12/1985 | Matsumura | 296/204 |
| 4,836,600 | 6/1989 | Miyazaki et al. | 296/197 |
| 4,865,378 | 9/1989 | Filtri et al. | 296/197 |

FOREIGN PATENT DOCUMENTS

263178 10/1988 Japan .................. 296/204
0187972 6/1989 Japan .

*Primary Examiner*—Robert R. Song
*Attorney, Agent, or Firm*—Fish & Richardson

[57] ABSTRACT

A reinforced floor structure for an automotive vehicle includes a tunnel member protruding upwardly and extending in a direction to the front and rear of the vehicle, a pair of front floor panels disposed at right and left sides of the tunnel member, a rear floor panel connected with the front floor panel via a stepped portion having a vertical wall, with the tunnel member extending backward so as to penetrate the vertical wall and being connected to a lower surface of the rear floor panel.

17 Claims, 4 Drawing Sheets

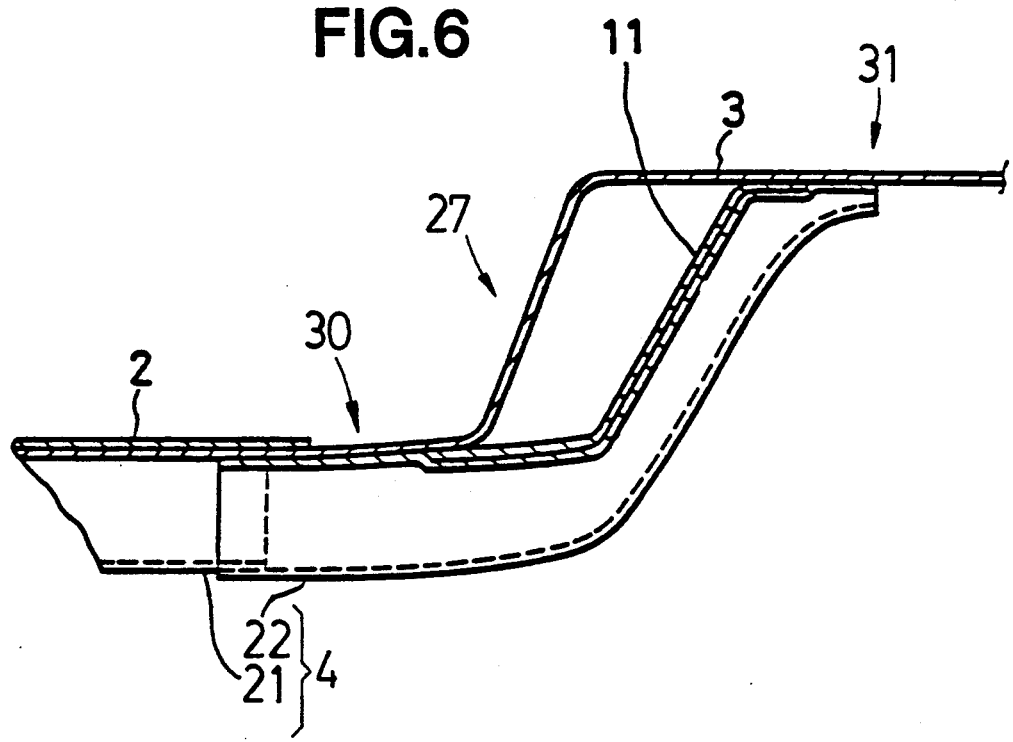
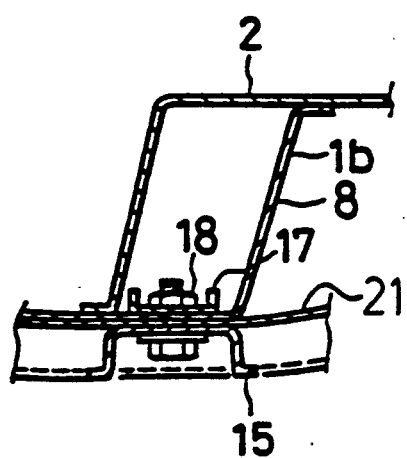
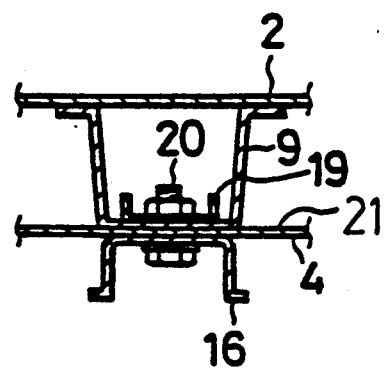

REINFORCED FLOOR STRUCTURE FOR AN AUTOMOTIVE VEHICLE

FIELD OF THE INVENTION

This invention relates to a reinforced floor structure for an automotive vehicle.

BACKGROUND OF THE INVENTION

In general, floor structures in automotive vehicles are known which have a drive shaft and an exhaust pipe extending underneath the floor in a front to back direction. This type of floor structure includes a tunnel portion which is formed as a part of a floor, normally at a front midway portion of the floor in a front to rear direction. The cross section of the tunnel portion is usually a hat-shaped configuration protruding upwardly from the surface of the floor, since the essential function of the tunnel portion is to provide an accommodating space for the drive shaft and the exhaust pipe underneath the floor at an appropriate height and to provide a passenger compartment which is as roomy as possible.

For example, Japanese Laid-open Utility Model Application No. 01-87972 discloses such a conventional tunnel portion having a hat-shaped cross section, which is formed on a floor, and extending from a front end of the floor to a rear end. Moreover, in an advanced commercial purpose vehicle, the floor is made of a front floor panel and a rear floor panel, and the rear floor panel is formed stepwise against the front floor panel so that the rear floor panel extends above the front floor panel. In such a commercial vehicle, a hat-shaped tunnel portion is only formed in the front floor panel portion, since the upper height of the tunnel is almost the same as the height of the rear floor panel. As a result, the rear floor panel is formed in a plane configuration without being reinforced by the tunnel. As a result, the rear floor panel is not rigid enough, and the connection between the front floor panel and the rear floor panel is relatively weak.

SUMMARY OF THE INVENTION

It is a feature of this invention to provide a reinforced floor structure for an automotive vehicle which has improved connecting strength between the front floor panel and the rear floor panel. Another feature of this invention provides a reinforced floor structure for an automotive vehicle which can increase the rigidity of the rear floor panel. Yet another feature of this invention provides a reinforced floor structure for an automotive structure which can sufficiently reinforce the rear floor while providing a roomy passenger compartment.

The invention, therefore, in its general outlines, relates to a reinforced floor structure for an automotive vehicle including a front floor portion which can include a front floor panel, and a rear floor portion including a rear floor panel. The rear floor portion is connected with a rear end of the front floor portion to form the floor of the vehicle. A tunnel portion which consists of a part of the front floor portion and a part of the rear floor portion, through which the drive shaft and exhaust pipe extend, has a first tunnel portion projecting upwardly from the front floor panel and a second tunnel portion provided under the rear floor panel, each of which extends in a front to rear direction of the automotive vehicle.

These features and other advantages of the invention will be apparent to persons skilled in this art from reading the disclosure in this application.

BRIEF DESCRIPTION OF THE DRAWINGS

FIG. 6 is a vertical cross sectional view of the floor structure taken along line D—D in FIG. 1;

FIG. 7 is a vertical cross sectional view taken along line E—E in FIG. 3; and

FIG. 8 is a vertical cross sectional view taken along line F—F in FIG. 5.

DETAILED DESCRIPTION OF THE INVENTION

Figure 1:
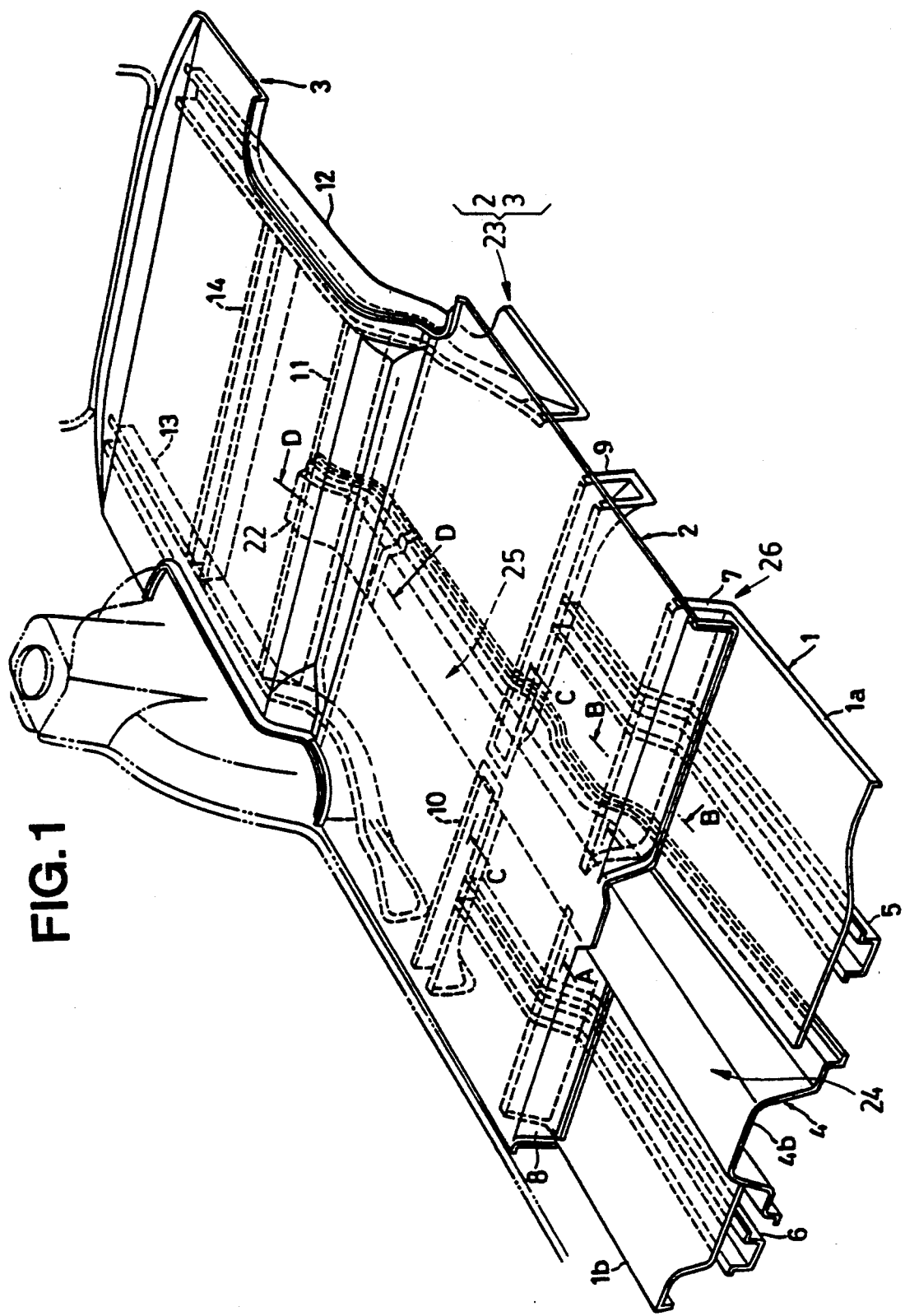
FIG. 1 is a perspective view showing the floor structure of an automotive vehicle in accordance with this invention.

The floor structure for an automotive vehicle in accordance with this invention comprises a front floor panel 1 which is located within the vehicle in a position which corresponds to the front seat(not shown), and a rear floor panel 23 which is disposed stepwise against the front floor panel 1 so that the plane of the surface of rear floor panel 23 is located above that of front floor panel 1. The rear floor panel 23 has a forward rear floor panel 2 and a backward rear floor panel 3. The backward rear floor panel 3 is also disposed stepwise against the forward rear floor panel 2 so that the plane of the surface of backward rear floor panel 3 is located above that of forward rear floor panel 2. The step between the front floor panel 1 and the rear floor panel 23 is denoted in the drawings as first step portion 26, and the other step between the forward rear floor panel 2 and the backward rear floor panel 3 is denoted as second step portion 27.

Figure 3:
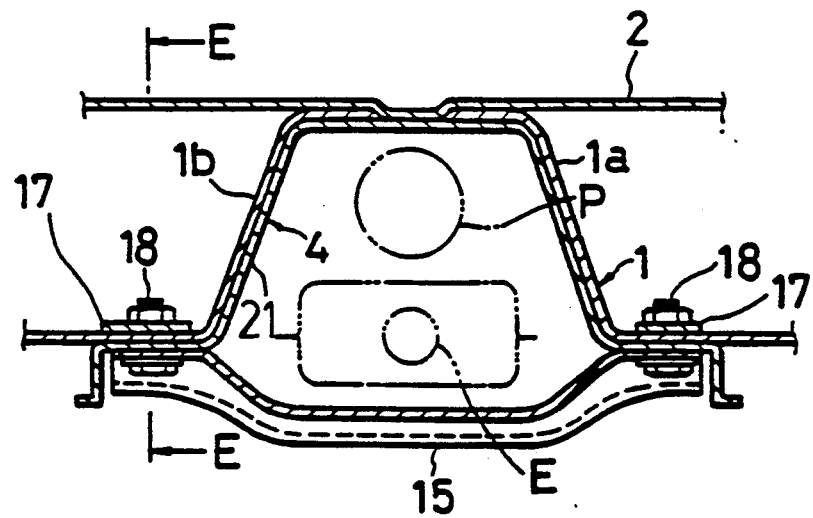
FIG. 3 is a vertical cross sectional view of the floor structure taken along line A—A in FIG. 1.

The front floor panel 1 includes as its middle portion a floor tunnel member 4 having a tunnel portion which has a hat-shaped vertical cross section in a transverse direction, as shown in FIG. 3. This floor tunnel member 4 extends rearward to the backward rear floor panel 3 via the forward rear floor panel 2. The front floor panel 1 is further divided into two members, that is, a left front floor panel 1a and a right front floor panel 1b, each of a plane configuration, which are disposed along opposite edges of the floor tunnel member 4.

The floor tunnel member 4 is made up of a front floor tunnel member 21 and a rear floor tunnel member 22. Hereinafter, the front portion of the floor tunnel member 4 in front of the first step portion 26 is referred to as first tunnel portion 24, and the rear portion of the floor tunnel member 4 extending to the rear of the vehicle from the first step portion 26 is referred to as second tunnel portion 25. Furthermore, the floor tunnel member 4 extends rearward as it penetrates the first step portion 26 through a cutout 29.

The inner ends of the left front floor panel 1a and the right front floor panel 1b are fixed by spot welding to horizontal flanges 21a on either side of the floor tunnel member 4, respectively. Reverse hat-shaped side frames 5 and 6, each extending in a front to rear direction, are secured to the lower surfaces of the left front floor panel 1a and the right front floor panel 1b, respectively. These side frames 5 and 6 are further connected at their front ends with the rear ends of front frames, which are not shown, extending from the engine compartment of the vehicle.

Figure 4:
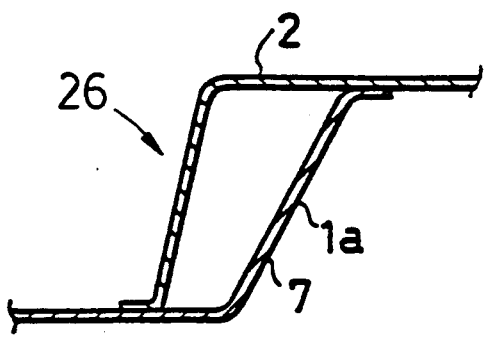
FIG. 4 is a vertical cross sectional view of the floor structure taken along line B—B in FIG. 1.

A front end of the forward rear floor panel 2 is disposed so as to overlap with a rear end of the front floor panel 1 to form a pair of closed cross section portions 7 and 8, each extending in a transverse direction, at both sides of the floor tunnel member 4, as shown in FIG. 4. The inner ends of the closed cross section portions 7 and 8 are formed to fit to the configuration of side portions 21b of the front floor tunnel member 21, respectively. Therefore, the floor tunnel member 4 can be reinforced by connecting the inner ends of the closed cross section portions 7 and 8 to the front floor tunnel member 21.

Figure 5:
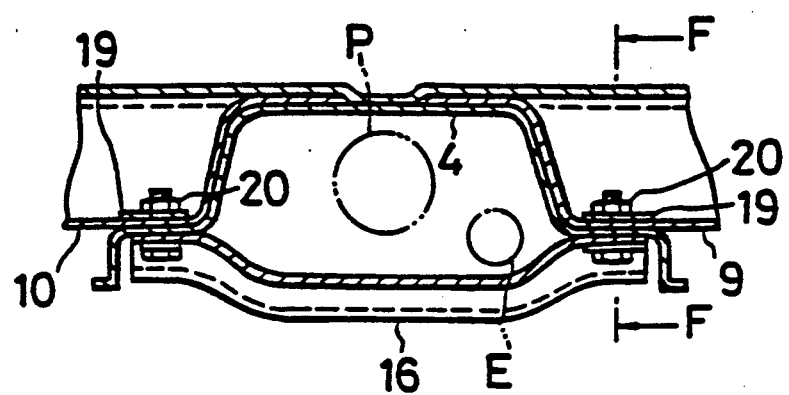
FIG. 5 is a vertical cross sectional view of the floor structure taken along line C—C in FIG. 1.

The forward rear floor panel 2 is located just on top of floor tunnel member 4. A pair of U-shaped cross members 9 and 10, each extending in a transverse direction from the floor tunnel member 4, are connected to and across the lower surface of the forward rear floor panel 2 at about the midpoint between the front and rear of the forward rear floor panel 2. The inner ends of these cross members 9 and 10 are formed to fit to the configuration of the side portions 21b of the front floor tunnel member 21, and are connected to the side portions 21b, as shown in FIG. 5.

Side frames 5 and 6 extend rearward and are connected, at their rear ends, with cross members 9 and 10.

The backward rear floor panel 3 is connected at its front end with the rear end of the forward rear floor panel 2. The backward rear floor panel 3 includes a first horizontal portion 30 which is formed horizontally at a front end portion, second step portion 27 (as referred to above) which inclined so as to rise toward the rearward direction from first horizontal portion 30, and a second horizontal portion 31 which is formed horizontally so as to extend rearward from second step portion 27.

The backward rear floor panel 3 is connected at the second step portion 27 with a cross member 11, which extends in a transverse direction and is disposed outside of the backward rear floor panel 3, so as to form a closed cross section portion as shown in FIG. 6.

The rear floor tunnel member 22 of the floor tunnel member 4 extends backward so as to fit to the configuration of the cross member 11, and the rear floor tunnel member 22 is secured to the cross member 11.

Figure 2:
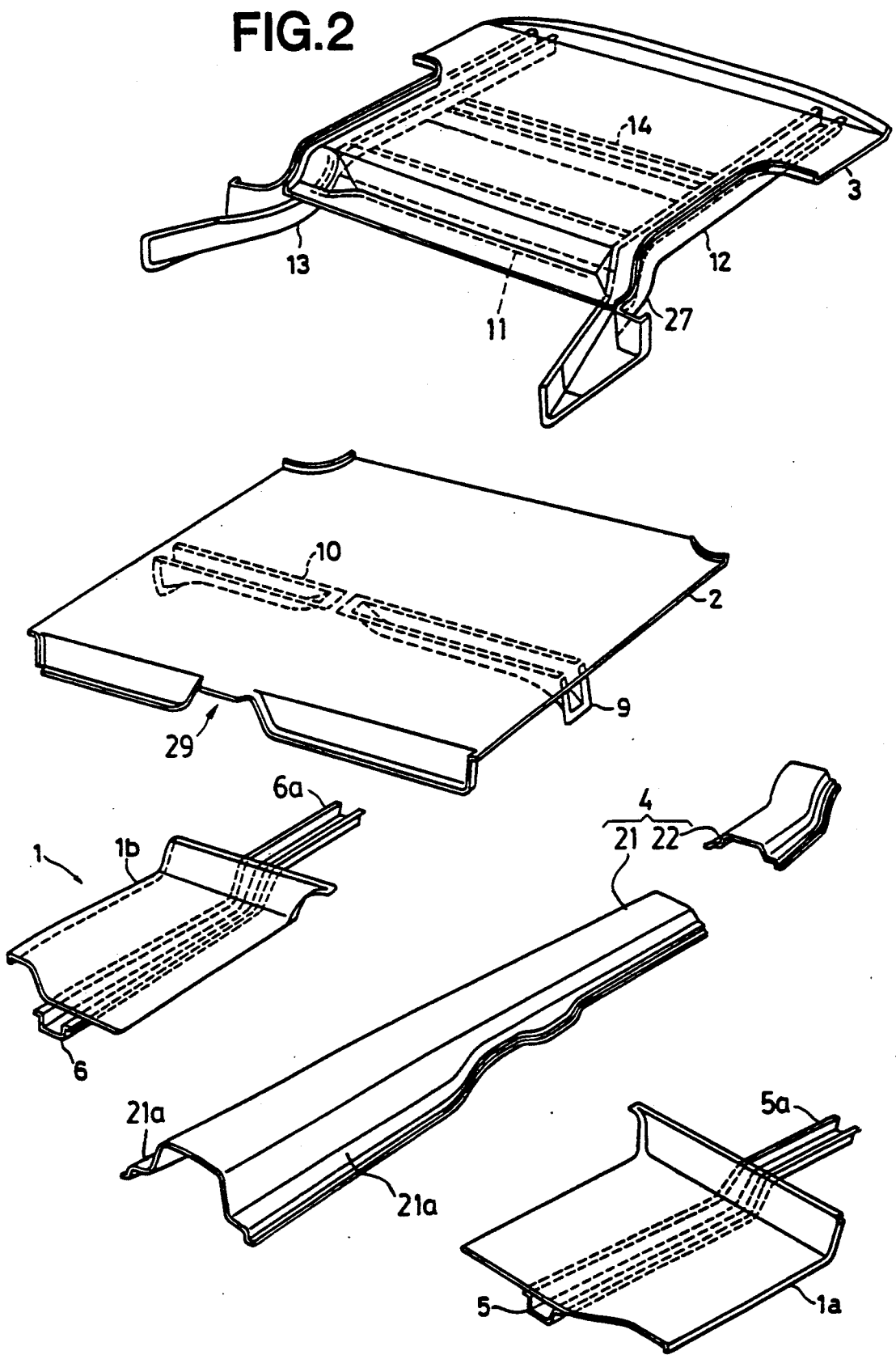
FIG. 2 is an exploded perspective view showing floor assembly parts of the floor structure of FIG. 1.

A pair of U-shaped rear side frames is connected to the lower surface of the backward rear panel 3 at opposing right and left sides. The front ends of these rear side frames 12 and 13 are bent outwardly so as to expand in cross section, as can be seen from the upper exploded view in FIG. 2, and are connected with side sills (not shown) each having a closed cross section and extending along right and left sides of the backward rear floor panel 3.

The cross member 11 is connected at its ends with the rear side frames 12 and 13, respectively. A U-shaped cross member 14, extending in a transverse direction, is secured to the lower surface of the backward rear floor panel 3 at its middle portion in a front to rear direction. Cross member 14 is also connected at both its ends with the inner sides of the rear side frames 12 and 13.

As shown in FIG. 3, a first mount member 15 is disposed in a transverse direction and is connected with the lower flange portions of the floor tunnel member 4 so that the first mount member 15 bridges the closed cross section portions 7 and 8. Similarly, as shown in FIG. 5, a second mount member 16 is disposed in a transverse direction and is connected with the lower flange portions of the floor tunnel member 4 so that the second mount member 16 bridges the cross members 9 and 10.

These first and second mount members 15 and 16 are used to support a drive shaft P and an exhaust gas pipe E, both of which are shown by phantom lines in FIG. 3. Both the ends of the first mount member 15 are, as shown in FIGS. 3 and 7, fixed to the floor tunnel member 4 and the front floor panel 1 by means of bolts and nuts 18 through a bracket 17. Similarly, the both ends of the second mount member 16 are, as shown in FIGS. 5 and 8, fixed to the floor tunnel member 4 and cross members 9 and 10 by means of bolts and nuts 20 through a bracket 19.

Though the above embodiment shows the front floor tunnel member 21 as a single panel, a plurality of panels can also be assembled to form the front floor tunnel member 21. For manufacturing purposes, the front floor tunnel member 21 can be divided into a first tunnel member and a second tunnel member. The first tunnel member is connected to the front floor panel 1 and the second tunnel member is connected to the rear floor panel 23 prior to assembly of the tunnel members. Then, the first tunnel member and the second tunnel member can be connected.

In accordance with this invention, the strength of the connection between the front floor panel and the rear floor panel can be improved. Further, this invention can increase the rigidity of the rear floor without reducing the available space of the passenger compartment.

What is claimed is:

1. A reinforced floor structure for an automotive vehicle, comprising:
   a front floor portion including a front floor panel which defines a front surface plane;
   a rear floor portion including a rear floor panel which defines a rear surface plane;
   said rear floor portion being connected with a rear end of the front floor portion to form a floor for the vehicle;
   a transversely extending stepped portion formed between the front surface plane and the rear surface plane; and
   a tunnel member comprising a part of each of the front floor portion and the rear floor portion;
   said tunnel member comprising a first tunnel portion projecting upwardly from the front surface plane and a second tunnel portion provided under the rear floor panel, each of the first tunnel portion and the second tunnel portion extending in a front to rear direction of the automotive vehicle.

2. A reinforced floor structure for an automotive vehicle in accordance with claim 1, wherein the first tunnel portion and the second tunnel portion are integrally formed together to make said tunnel.

3. A reinforced floor structure for an automotive vehicle in accordance with claim 2, wherein the front floor portion comprises three panels, one panel forming the tunnel member and two other plane panels disposed at right and left sides of the tunnel member.

4. A reinforced floor structure for an automotive vehicle in accordance with claim 1, wherein the rear floor panel comprises a forward rear floor panel and a backward rear floor panel, wherein the forward rear floor panel is disposed in front of the backward rear floor panel, and the second tunnel portion is connected to a lower surface of the forward rear panel.

5. A reinforced floor structure for an automotive vehicle in accordance with claim 4, wherein the second tunnel portion is divided into a forward portion and a backward portion, and the backward portion of the second tunnel portion is connected to a lower surface of the backward rear floor panel.

6. A reinforced floor structure for an automotive vehicle, in accordance with claim 1, wherein a front end of the rear floor panel is disposed to overlap with a rear end of the front floor panel so as to form a pair of closed cross section portions, and inner ends of said pair of closed cross section portions are formed to fit to the configuration of the first and second tunnel portions.

7. A reinforced floor structure for an automotive vehicle in accordance with claim 6, wherein the front end of the rear floor panel is bent downward and connected to an upper surface of the front floor panel, and the rear end of the front panel is bent upward and connected to a lower surface of the rear floor panel, so that the front floor panel and the rear floor panel form said pair of closed cross section portions.

8. A reinforced floor structure for an automotive vehicle, comprising:
a front floor portion including a front floor panel which defines a front surface plane;
a rear floor portion including a rear floor panel which defines a rear surface plane;
said rear floor portion being connected with a rear end of the front floor portion to form a floor for the vehicle; and
a tunnel member comprising a part of each of the front floor portion and the rear floor portion;
said tunnel member comprising a first tunnel portion projecting upwardly from the front surface plane and a second tunnel portion provided under the rear floor panel, each of the fist tunnel portion and the second tunnel extending in a front to rear direction of the automotive vehicle,
wherein a first step is provided between the front floor portion and the rear floor portion so that the rear floor portion is located at a position above the front surface plane.

9. A reinforced floor structure for an automotive vehicle, comprising:
a front floor portion including a front floor panel which defines a front surface plane;
a rear floor portion including a rear floor panel which defines a rear surface plane;
said rear floor portion being connected with a rear end of the front floor portion to form a floor for the vehicle; and
a tunnel member comprising a part of each of the front floor portion and the rear floor portion;
said tunnel member comprising a first tunnel portion projecting upwardly from the front surface plane and a second tunnel portion provided under the rear floor panel, each of the first tunnel portion and the second tunnel portion extending in a front to rear direction of the automotive vehicle,
wherein a first step is provided between the front floor portion and the rear floor portion so that the rear floor portion is located at a position above the front surface plane, and the tunnel member is disposed under the rear floor portion in a region to the rear of the vehicle from the first step.

10. A reinforced floor structure for an automotive vehicle in accordance with claim 1, wherein the rear floor portion comprises a forward rear floor panel and a backward rear floor panel, and a second step is provided between the forward rear floor panel and the backward rear floor panel so that the backward rear floor is located at a position above the forward rear floor panel.

11. A reinforced floor structure for an automotive vehicle in accordance with claim 1, wherein the front floor panel and the rear floor panel are connected with each other so as to form a stepped portion having a vertical wall.

12. A reinforced floor structure for an automotive vehicle in accordance with claim 11, wherein the tunnel member extends backward so as to penetrate the vertical wall.

13. A reinforced floor structure for an automotive vehicle in accordance with claim 1, wherein a pair of cross members is provided under the rear floor panel in a transverse direction so as to support both sides of the tunnel member.

14. A reinforced floor structure for an automotive vehicle, comprising:
a front floor portion including a tunnel portion protruding upwardly and extending in a front and rear direction in the vehicle;
a rear floor portion provided upwardly and rearward against the front floor portion via a stepped portion; and
said tunnel portion extending rearward under the rear floor portion by penetrating the stepped portion;
a pair of closed cross section portions formed at the stepped portion in a transverse direction;
said pair of closed cross section portions being connected with the tunnel portion at their inner ends so that their inner ends are closed by a rear part of said tunnel portion disposed under the rear floor portion.

15. A reinforced floor structure for an automotive vehicle in accordance with claim 14, wherein the front floor portion comprises a tunnel member which forms the tunnel portion and a pair of plane panel members located at right and left sides of the tunnel member.

16. A reinforced floor structure for an automotive vehicle in accordance with claim 15, wherein rear ends of said pair of plane panel members are connected with a front end of a rear floor panel which forms the rear floor portion.

17. A reinforced floor structure for an automotive vehicle in accordance with claim 14, wherein the front floor portion includes a front floor panel and the rear floor portion includes a rear floor panel, and a rear end of the front floor panel is bent upward and connected to a lower surface of the rear floor panel, and a front end of the rear floor panel is bent downward and connected to an upper surface of the front floor panel, so that the front floor panel and the rear floor panel form said pair of closed cross section portions.

* * * * *